2,020,459
Patented Feb. 6, 1962

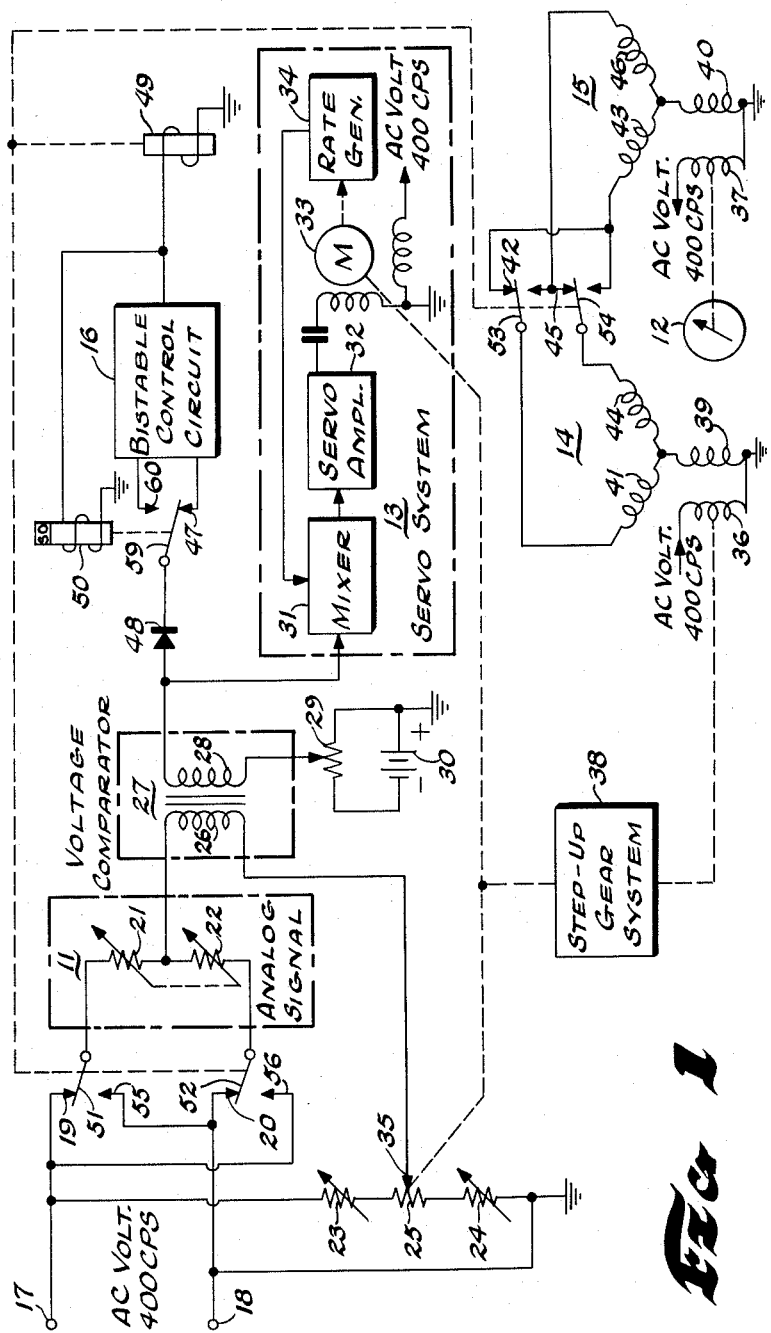

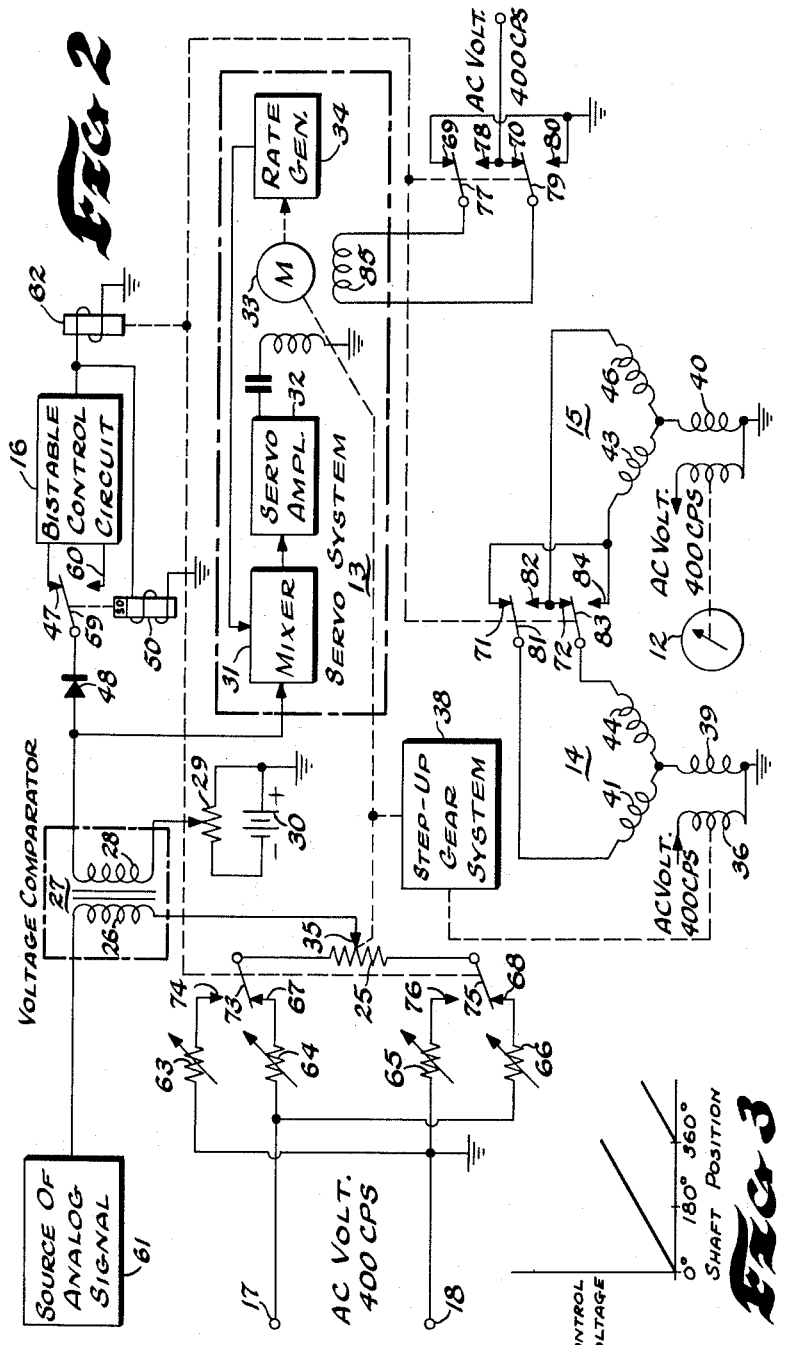

3,020,459
ANALOG-VOLTAGE SHAFT POSITIONING SYSTEM
Charles O. Feigleson, Cedar Rapids, Iowa., assignor to Collins Radio Company, Cedar Rapids, Iowa, a corporation of Iowa
Filed Feb. 3, 1958, Ser. No. 713,063
3 Claims. (Cl. 318—28)

This invention pertains to remote control shaft positioning systems and particularly to systems of the type that position a remote shaft according to the value of an analog input control voltage.

In certain shaft positioning systems, the drive system for positioning the remote shaft also drives a potentiometer from which is derived a voltage that is compared with the input control voltage. When the locally derived voltage and the input control voltage are related according to a predetermined ratio, the control shaft is properly positioned and the drive system is stopped. A common type potentiometer that may be used in a shaft control system varies a voltage from a minimum value to a maximum value over a particular rotational range, for example, a range of 350 degrees as the potentiometer is driven in one direction. At the end of the range the voltage becomes discontinuous and further rotation of a few degrees in the same direction past the point of maximum voltage returns the voltage to its minimum value. In order to avoid the discontinuous portion of the range, rotation of the potentiometer arm is limited to a value less than 360 degrees and the arm is then reversed in direction of rotation as required to produce the proper voltage to match the input control voltage. In a simple reversible drive arrangement, the controlled shaft may be operated at times over a range of rotation exceeding 180 degrees in order to rotate the shaft to a position that is only a few degrees from its former position.

An object of the present invention is to provide an analog-voltage controlled remote shaft positioning system in which a minimum amount of rotation is required for positioning the shaft. A feature of this invention is the combination of switching circuits for reversing the direction in which the arm of a potentiometer is to be rotated relative to the direction of change of the controlled voltage.

Accordingly, the control circuit of this invention embodies a potentiometer, a voltage comparator circuit that is connected to a source of analog-voltage and to said potentiometer, means for reversing the relative polarities of the voltages that are applied from said signal source and said potentiometer to said voltage comparator circuit, said reversing means being operated when the difference in the voltage that is applied to said comparator circuit becomes greater than a predetermined value, and said means operating to reverse the direction of rotation of an output shaft relative to the phase of output voltage from said comparator. In a control system utilizing the switching circuits of this invention, the drive system rotates the controlled shaft through the shortest direction from one position to a newly selected position.

The description and the appended claims may be more readily understood with reference to the accompanying drawings in which:

FIGURE 1 is a schematic diagram of the shaft positioning system of this invention in which switching circuits connected to analog signal circuits change the relative phase of the input analog signal and the voltage derived from the control potentiometer;

FIGURE 2 is a schematic diagram of a modification of this invention in which switching circuits connected to the control potentiometer change the relative phases; and FIGURE 3 is a graph of controlled shaft position versus input analog control voltage.

The embodiment shown in FIGURE 1 comprises an analog signal circuit 11 for developing a signal for positioning output indicator 12. The analog signal is applied to servo system 13 which is coupled through synchro transformers 14 and 15 to indicator 12. In this particular embodiment the analog signal circuit is shown for simplicity as comprising a pair of serially connected resistors that are operated simultaneously for developing an analog voltage having a linear voltage characteristic versus desired output shaft position as shown in FIGURE 3. Usually a circuit for developing an analog voltage is controlled from a remote station that transmits a command signal modulated in accordance with a position to be acquired by a remote shaft. The remote control station may be a radio transmitting station for transmitting a signal to a local receiver that develops the analog signal.

Terminals 17 and 18 that are connected to a source of alternating-current signal are connected through relay contacts 19 and 20 to series-connected analog variable resistors 21 and 22, respectively. The terminals 17 and 18 are also connected through calibrating resistors 23 and 24 respectively to opposite terminals of potentiometer 25. Primary winding 26 of voltage comparator transformer 27 is connected in a bridge circuit arrangement between the junction of analog resistors 21 and 22 and the arm of potentiometer 25. Obviously, potentiometer 25 may be set to a position corresponding to that of ganged variable resistors 21 and 22 so that the alternating-current in winding 26 is balanced out.

When the remote shaft is not positioned in accordance with the command signal, voltage derived from potentiometer 25 causes an unbalanced condition to exist and control voltage is induced into the secondary winding 28 of transformer 27. One terminal of secondary winding 28 is connected to an adjustable source of negative potential which for simplicity is shown in the schematic diagram as potentiometer 29 and direct-current voltage source 30. The opposite terminal of winding 28 is connected to the input mixer circuit 31 of servo system 13 and is connected to a bistable control circuit 16 that controls direction of operation of the servo system.

The servo system 13 is conventional and comprises input mixer 31 having its output connected to servo amplifier 32. Servo amplifier 32 has its output connected for supplying power to servo motor 33. In addition to being connected to a control shaft, servo motor 33 is connected to rate generator 34 for developing a feedback signal that is returned to mixer 31. The rate generator stabilizes operation of the servo amplifier in a manner well known in the art. The direction of rotation of servo motor 33 is dependent upon the phase of the input voltages applied to mixer 31.

Servo motor 33 drives arm 35 of potentiometer 25 and in addition drives rotor 36 of synchro transmitter 14 through step-up gear system 38. Step-up gear system 38 is required between a shaft that operates potentiometer arm 35 and that which operates rotor 36 because the potentiometer does not make a full revolution whereas it is required that the rotor of synchro transmitter 14 be operated over a full 360° of rotation. The stator windings of synchro transmitter 14 are connected to those of synchro receiver 15. Stator winding 39 of synchro transmitter 14 and stator winding 40 of synchro receiver 15 are connected together through a ground circuit. The other two windings of the synchros are connected together through double-pole double-throw switch contacts of a control relay. When the relay is released, stator winding 41 of synchro transmitter 14 is connected through relay contact 42 to stator winding 43 of synchro receiver 15. Also, stator winding 44 of synchro transmitter 14 is connected through relay contact 45 to winding 46 of synchro receiver 15.

The circuit for connecting bistable control circuit 16 to secondary winding 28 of voltage comparator transformer 27 includes relay contact 47 and rectifier diode 48. When the positive peak of the control signal that is induced into winding 28 exceeds the negative bias voltage that is applied to winding 28 from the arm of potentiometer 29, the diode 48 becomes conductive and the positive pulse is applied through relay contact 47 to a first input circuit of bistable control circuit 16. The bistable control circuit may be a conventional multivibrator circuit that has two circuits that are alternately conductive and non-conductive. One of these circuits includes the operating windings of fast-acting relay 49 and slow-acting relay 50. Assume that this circuit that includes the windings of relays 49 and 50 is non-conductive, that armature 59 of relay 50 is released and that a positive pulse has not yet been applied through contact 47 to the bistable control circuit. When a command signal that is transmitted from the remote transmitting station exceeds a value that would require indicator 12 to be rotated over an arc greater than 180° if its direction of rotation were not reversible, a positive pulse is applied through contact 47 to trigger the bistable control circuit and thereby to cause the circuit that includes relays 49 and 50 to become conductive. Relay 49 operates to actuate armatures 51 and 52 for opening contacts 19 and 20 and for closing contacts 55 and 56. Through operation of armatures 51 and 52, the phase of the alternating-current voltage that is applied from terminals 17 and 18 is changed 180° for application to analog signal circuit 11. Relay 49 also actuates armatures 53 and 54 for interchanging the connections that extend from windings 41 and 44 of synchro transmitter 14 to windings 43 and 46 of synchro receiver 15.

After bistable control circuit 16 and quick-acting relay 49 have operated but before the operation of slow-operating relay 50, servo system 13 operates to position arm 35 of potentiometer 25 so as to reduce the control voltage that is being applied to the input circuit of bistable control circuit 16. After an interval, relay 50 actuates armature 59 for opening contact 47 that is connected to a first input circuit of control circuit 16 and closes contact 60 which is connected to a second input circuit of control circuit 16. The input circuit of the bistable control circuit is thereby prepared for a subsequent positive control pulse that will render the circuit that includes the windings of relays 49 and 50 non-conductive so that the relays will be released. The subsequent positive impulse will normally be received when the change in command signal exceeds a value that would require rotation of the arm 35 of potentiometer 25 over a range corresponding to 180° of rotation of indicator 12.

To understand more clearly the operation of FIGURE 1, let us assume that potentiometer 25 is rotatable over 350° and that pointer 12 which is operated by rotor 37 of synchro receiver 15 is a direction indicator that is continuously rotatable over a 360° calibration corresponding to that of a directional compass. The step-up gear system 38 provides proper gear ratio so that indicator 12 rotates over 360° while arm 35 of potentiometer 25 operates over 350°. Also assume that when relay 49 is released so that the circuits which it controls are completed as shown in FIGURE 1, the reading of indicator 12 approaches zero as the arm 35 of potentiometer 25 is rotated toward that terminal that is connected through calibration resistor 24 to terminal 18 of the alternating-current voltage source. Furthermore, let us assume that the command input signal voltage has been changed from a voltage that corresponds to a reading of 20° on indicator 12 to a voltage that corresponds to 10°. A voltage will appear across winding 28 of voltage comparator 27 to operate servo system 13 for rotating arm 35 in a direction toward terminal 18 of the alternating-current voltage source and for operating through gear system 38 to position rotor 36 of synchro transmitter 14. When the arm reaches a position that corresponds to a 10° reading, voltage comparator 27 will become zero and servo system 13 will cease operation. The synchro transmitter operates through a common ground connection and also through relay contacts 42 and 45 to position rotor 37 of synchro receiver 15 and thus to position indicator 12 for a reading of 10°.

Assume that the next command signal transmitted from a remote transmitter corresponds to an indicator reading of 350° so that the indicator will need to be rotated only 20° providing it is rotated most directly to its new reading. With reference to FIGURE 3, a relatively large alternating-current voltage which corresponds to a range greater than 180° appears across winding 28 of voltage comparator 27. Since positive peaks of this voltage are greater than the negative bias voltage that is applied from the arm of potentiometer 29 to diode 48, the diode 48 becomes conductive and applies a positive pulse through contracts 47 to bistable control circuit 16. Therefore, the bistable control circuit is triggered for operating relay 49. As previously described, operation of relay 49 causes the voltage that is derived from analog signal circuit 11 to be changed in phase 180°. With reference to FIGURE 3, when potentiometer arm 35 is set for an indicator reading of 10°, it is observed that voltage on the arm is relatively low and differs from a minimum control voltage that corresponds to a zero reading in the same amount as a voltage for 350° differs from a maximum reading that corresponds to 360°. Therefore, since the polarity of the voltage across the potentiometer has been reversed, the changing of command signal from a reading of 10° to 350° does not require that the position of arm 35 be changed in order to apply zero voltage to the input of servo system 13. Therefore, the position of rotor 36 of synchro transmitter 14 remains unchanged. However, because the operation of relay 49 interchanges the connections between the windings of synchro transmitter 14 and the windings of synchro receiver 15, the position of indicator 12 is changed to show the new reading of 350°.

Had the command signals been changed from a reading of 10° to a reading of 340°, relay 49 would have operated and in addition servo system 13 would have been required to rotate potentiometer arm 35 over a range corresponding to a change in indicator reading of 10°. Obviously, if the control circuit that includes relay 49 were not included in the shaft positioning system, potentiometer arm 35 would have to be operated over a range corresponding to 340° when the command signal is changed from a reading corresponding to 10° to a reading corresponding to 350° and likewise indicator 12 would have to be rotated in a long direction over a range of 340°.

In either circuit shown in FIGURES 1 and 2, the operation of the quick-acting relay that is controlled by bistable control circuit 16 changes the relative phase between that voltage which is applied from the analog signal circuit and that which is derived from potentiometer 25 for application to voltage comparator circuit 27. Whereas in the circuit of FIGURE 1 relay 49 operates to change the phase (in effect, reverse the polarity) of the voltage derived from analog signal circuit 11, in the circuit of FIGURE 2 the corresponding relay 62 operates to change the phase voltage derived from potentiometer 25. In the circuit according to FIGURE 1, the operation of relay 49 changes the phase of the command signal before it is applied to servo system 13 so that the direction of rotation of servo motor 33 is reversed. Since in the circuit of FIGURE 2 the phase of the command signal is not reversed before it is applied to the input of servo system 13, reversal of servo motor 33 is accomplished by reversing the phase of the alternating-current voltage that is applied to field winding 85 of servo motor 33. In either of the shaft positioning systems the operation of the fast-acting relay that is controlled by the bistable control circuit interchanges circuit connections between synchro transmitter and the synchro receiver. Even though the direction of the servo system may be reversed with respect to the command signal, the direction of operation of indicator 12 will be correlated with the direction of change of the command signal.

When the command signal is changed over a range corresponding to a change in indicator reading of less than 180°, the operation of FIGURE 2 corresponds to the operation of FIGURE 1 over the same range. Assume that the output circuit of bistable control circuit 16 is non-conductive so that quick-acting relay 62 and slow-operating relay 50 are released. Then the alternating-current voltage from terminals 17 and 18 is applied through calibration resistors 64 and 66 and relay contacts 67 and 68, respectively, to opposite terminals of potentiometer 25. The alternating-current voltage is also applied through relay contact 69 and relay contact 70 to field winding 85 of servo motor 33. While relay 62 is released, it also connects winding 41 of synchro transmitter 14 through relay contact 71 to winding 43 of synchro receiver 15 and connects winding 44 of synchro transmitter 14 through relay contact 72 to winding 46 of synchro receiver 15. While relay 50 is released, the input circuit of bistable control circuit 16 is connected through relay contact 47 and through diode 48 to secondary winding 28 of voltage comparator 27.

When the transmitted command signal is changed from the value corresponding to an indicator reading of 10° to a value corresponding to a reading of 350°, the circuit of FIGURE 2 performs the same function as that described above for the circuit of FIGURE 1. However, the operation of quick-acting relay 62 controls the reversing of servo system 13 by switching different control circuits. Change in command input signal over a range exceeding 180° causes the operation of relay 62 as previously described for FIGURE 1. Operation of relay 62 actuates armatures 73 and 75 for opening contacts 67 and 68 and for closing contacts 74 and 76. Potentiometer 25 is now connected in a reverse sense to the alternating-current voltage source through contacts 74 and 76 and calibration resistors 63 and 65. Calibration resistor 63 is set for a resistance corresponding to that of resistor 66 and calibration resistor 64 is set to a value corresponding to that of resistor 65 so that potentiometer 25 covers the same range of voltages regardless of the operation of relay 62. Operation of relay 62 actuates armatures 77 and 79 for reversing the phase of the alternating-current voltage that is applied to field winding 85 of servo motor 33. Relay contacts 69 and 70 in the field circuit are opened and contacts 78 and 80 are closed. Operation of relay 62 also actuates armatures 81 and 83 for opening contacts 71 and 72 and for closing contacts 82 and 84 to interchange connections between windings of synchro transmitter 14 and synchro receiver 15.

The shaft positioning system of FIGURE 2 responds to a change in command voltage from 350° to 10° to produce the same result as the system of FIGURE 1 in that operation of fast-acting relay causes the drive for potentiometer 25 and synchro transmitter rotor 36 to be reversed in direction. Also, interchange of interconnection between the windings of the synchro transmitter and the synchro receiver cause indicator 12 to move directly through its 360° reading to its 10° reading.

As described in FIGURE 1, a large change in command signal causes operation of fast-acting relay 62 and thereby causes the servo system to operate for reducing the voltage that is induced into winding 28 of voltage comparator 27. After the peak voltage has been reduced until it is smaller than the bias voltage that is applied from potentiometer 29, diode 48 is non-conducting and slow-operating relay 50 operates to open relay contact 47 and close contact 60. The bistable control circuit 16 is therefore prepared for operation in response to a subsequent large change in value of the analog input signal. Relays 50 and 62 remain operated until the bistable control circuit is again triggered.

The circuits of FIGURES 1 and 2 may be modified and still be within the spirit and scope of the appended claims. For example, this circuit has been modified for using direct-current voltage rather than alternating-current voltage for the input analog signal. Likewise, direct-current voltage rather than alternating-current voltage is then applied to potentiometer 25. The voltage comparator for direct-current input voltages may be a bridge circuit that applies a differential voltage to the servo system. The servo system may be adapted for direct-current input signal may have a direct-current servo motor. When a direct-current servo motor is used, it may be reversed in direction of rotation by reversing the polarity of direct-current voltage as applied to its field winding through contacts of a quick-acting relay that is operated by bistable control circuit 16. When substantial torque or accurate positioning is required for an output load, a servo system may be inserted between the output of synchro transmitter 15 and the output load that corresponds to indicator 12.

Shaft positioning systems according to this invention are applicable to ground control approach systems for guiding aircraft. As an operator observes positions of aircraft that are to be guided on a radar screen at the ground station, the operator controls modulation of signal that is transmitted from the ground transmitter to a particular aircraft in accordance with a new heading which the operator determines for that aircraft. A receiver in the aircraft is tuned to the signal that is modulated in accordance with the heading which it is to follow. A shaft positioning system as described herein is connected to the radio receiver in the aircraft so as to receive the input signal that is modulated according to the desired heading. The shaft positioning system positions a heading indicator which the pilot observes for determining the desired heading for the aircraft.

What is claimed is:

1. In a shaft positioning system having a servo-control circuit including an input circuit and a potentiometer, means for developing a difference voltage between a signal applied to said input circuit and a voltage having an amplitude controlled by the operation of said potentiometer, an output shaft, and a servo system operating in response to the difference voltage developed by said means for positioning said potentiometer and for controlling the position of said output shaft, the direction of operation of said servo system being reversed in response to an inversion of phase of said difference voltage; reversing means operating in response to said difference voltage exceeding a predetermined value for inverting the phase between said voltages derived from said input signal and from said potentiometer, operation of said reversing means reversing the direction of operation of said servo system and said potentiometer, and means responsive to the operation of said reversing means for reversing the direction of operation of said output shaft relative to the direction of operation of said servo system and said potentiometer so that the direction of operation of said output shaft is determined by the phase of said input signal regardless of the operation of said reversing means.

2. In a servo-control system having a voltage comparator, a source of control signal, and a potentiometer for supplying a balancing voltage, said comparator having an input circuit connected to said source of control signal and to said potentiometer; a potentiometer reversing circuit including a bistable switching circuit, a unidirectional conducting element, said voltage comparator having an output circuit connected through said unidirection conducting element to said bistable switching circuit, means for biasing said unidirectional conducting element in a non-conducting sense, said unidirectional conducting element becoming conductive in response to the voltage across the output circuit of said voltage comparator exceeding a predetermined value as determined by said biasing means so as to apply a triggering pulse to said bistable switching circuit, said bistable switching circuit operating in response to the application of a triggering pulse to invert the phase of said input voltage relative to the phase of said balancing voltage, a servo motor operating in response to the application of voltage to the output circuit of said voltage comparator, and the direction of rotation of said servo motor being reversed in response to the inversion of said input voltage to said balancing voltage.

3. In a shaft positioning system including a servo system and a differential voltage sensing circuit connected to the input circuit of said servo system, means operating in response to control voltage that is applied from said sensing circuit to said servo system exceeding a predetermined value for inverting the phase of said control voltage and for reversing the direction of rotation of said servo motor, a synchro transmitter and a synchro receiver, each having a rotor and three stationary windings, said servo motor operating to position the rotor of said transmitter, an output shaft coupled to the rotor of said receiver, the stationary windings of said transmitter being connected to the stationary windings of said receiver so that the rotor of said receiver follows the rotation of the rotor of said transmitter, and said means operating to interchange connections between certain of said windings to reverse the relative directions of rotation of said rotors.

References Cited in the file of this patent

UNITED STATES PATENTS

| | | |
|---|---|---|
| 2,823,344 | Ragland | Feb. 11, 1958 |
| 2,823,435 | Ragland et al. | Feb. 11, 1958 |
| 2,861,233 | McKeown | Nov. 18, 1958 |